United States Patent [19]

Sakamoto et al.

[11] Patent Number: 4,723,356

[45] Date of Patent: Feb. 9, 1988

[54] WEIGHTY OBJECT MOUNTING SYSTEMS

[75] Inventors: Shunji Sakamoto; Tuyoshi Watanabe, both of Higashihiroshima; Shigeo Okamizu, Hiroshima, all of Japan

[73] Assignee: Mazda Motor Corporation, Japan

[21] Appl. No.: 911,055

[22] Filed: Sep. 24, 1986

[30] Foreign Application Priority Data

| Sep. 24, 1985 [JP] | Japan | 60-146430[U] |
| Oct. 8, 1985 [JP] | Japan | 60-225901 |
| Oct. 8, 1985 [JP] | Japan | 60-225902 |
| Oct. 8, 1985 [JP] | Japan | 60-154800[U] |
| Oct. 22, 1985 [JP] | Japan | 60-162639[U] |

[51] Int. Cl.$^4$ .................. B23P 21/00; B23Q 15/00
[52] U.S. Cl. .................. 29/714; 29/33 K; 29/33 P; 29/703; 29/712; 29/720; 29/794; 29/824; 198/341; 198/356; 198/420; 198/464.3; 198/468.8; 414/589
[58] Field of Search ............ 29/33 K, 33 P, 407, 29/429, 430, 703, 709, 711, 712, 714, 720, 791, 793, 794, 822, 823, 824; 198/341, 356, 420, 464.2, 464.3, 468.8; 414/589, 590

[56] References Cited

U.S. PATENT DOCUMENTS

| 3,968,559 | 7/1976 | Karlsson | 29/430 |
| 4,411,354 | 10/1983 | Thibault et al. | 29/430 X |
| 4,589,184 | 5/1986 | Asano et al. | 29/824 X |
| 4,589,199 | 5/1986 | Ohtaki et al. | 29/824 X |
| 4,604,797 | 8/1986 | Kitamura et al. | 29/430 X |
| 4,615,093 | 10/1986 | Tews et al. | 29/709 X |
| 4,627,158 | 12/1986 | Mitoh | 29/824 X |

FOREIGN PATENT DOCUMENTS

| 31501476 | 6/1983 | Fed. Rep. of Germany | 29/824 |
| 59-206266 | 11/1984 | Japan . | |

Primary Examiner—Howard N. Goldberg
Assistant Examiner—Ronald S. Wallace
Attorney, Agent, or Firm—Gerald J. Ferguson, Jr.; Michael P. Hoffman; Michael J. Foycik, Jr.

[57] ABSTRACT

A weighty object mounting system comprises tact-transporting means for transporting a transportable object so as to have the same stop temporarily at each working stations, position detecting means for detecting a stop position of the transportable object stopped at one of the stations, a lifter provided in a mounting station and including a mounting portion provided for supporting a weighty object placed thereon and arranged to be movable forward and backward, right and left, and up and down in relation to the transportable object in the mounting station and a driving portion for moving the mounting portion so as to cause the weighty object to engage with the transportable object and to be automatically mounted to the same, and control means operative to supply the driving portion with control commands which direct the driving portion to cause the mounting portion to have each of predetermined movements at a predetermined timing, and operative also to calculate a misalignment between the transportable object and the weighty object in the mounting station on the strength of a detection output of the position detecting means and to cause the driving means to amend the movements of the mounting portion in response to the calculated misalignment.

13 Claims, 16 Drawing Figures

WEIGHTY OBJECT MOUNTING SYSTEMS

BACKGROUND OF THE INVENTION

1. Field of the Invention

The present invention relates generally to weighty object mounting system, and more particularly, is directed to improvements in a weighty object mounting system for use in a vehicle assembling process.

2. Description of the Prior Art

For mounting an engine to a vehicle body in a vehicle assembling process, there has been proposed a conventional mounting system in which a vehicle body is hung on an over-head type conveyer to be subjected to tact-transportation and an engine is placed on a mounting table of a lifter provided in an engine mounting station to be lifted by the lifter when the vehicle body has come into the engine mounting station, so that the engine is engaged with the vehicle body to be mounted thereto. However, in such a mounting system, there is a disadvantage that if the engine is intended to be merely lifted by the lifter without any specific consideration, the vehicle body and engine may interfere with each other and therefore the engine may not be properly mounted to the vehicle body. In view of automatic mounting of the engine, to eliminate such disadvantage is an important subject.

As disclosed in the Japanese patent application published before examination under the publication number 59-206266, there is also previously proposed a mounting system in which a mounting table is provided to be able to move in the vertical, longitudinal and lateral directions, and driven to ascend and descend along a path for movement predetermined in accordance with the types of vehicle bodies and engines, together with the engine placed thereon, so as to prevent the engine from interfering with the vehicle body on the way to a proper position for engaging with the vehicle body.

However, in the previously proposed mounting system as mentioned above, a misalignment may arise between the vehicle body and the engine due to, for example, inclination of the vehicle body hung on the overhead conveyer. In the case of the misalignment thus brought about, it is still feared that the engine and the vehicle body interfere with each other.

In order to avoid such a misalignment, it is considered to detect the location of the vehicle body hung on the over-head conveyer and correct the route of the path for movement along which the engine ascends and descends. However, in the previously proposed mounting system, the moving table is arranged to move simply in the vertical, longitudinal and lateral directions, and therefore it is quite difficult to correct accurately the route of the path for movement along which the engine ascends and descends.

OBJECTS AND SUMMARY OF THE INVENTION

Accordingly, it is an object of the present invention to provide a weighty object mounting system which avoids the foregoing problems encountered with the prior art.

Another object of the present invention is to provide a weighty object mounting system by which a weighty object placed on a lifter is engaged with a transportable object transported by a tact-transporting device into a mounting station so as to be mounted to the same, and in which errors in position of the transportable object to the weighty object on the lifter in the mounting station is compensated so that the weighty object is prevented from interfering with the transportable object on the way to a proper position for engaging with the transportable object.

A further object of the present invention is to provide a weighty object mounting system by which an engine and front and rear suspensions can be mounted to one of bodies for vehicles of different types in a single mounting station provided on a vehicle body assembling line.

According to the present invention, there is provided a weighty object mounting system comprising tact-transporting means for transporting a transportable object in such a manner that the transportable object is stopped temporarily at each working stations arranged in series, position detecting means for detecting a stop position of the transportable object stopped temporarily at one of the stations, a lifter provided in a mounting station in which the weighty object is mounted automatically to the transportable object and including a mounting portion provided for supporting a weighty object placed thereon and arranged to be movable forward and backward, right and left, and up and down in relation to the transportable object carried into the mounting station and a driving portion for moving the mounting portion forward and backward, right and left, and up and down in relation to the transportable object in the mounting station so as to cause the weighty object to engage with the transportable object and to be automatically mounted to the same, and control means operative to supply the driving portion of the lifter with control commands directing the driving portion to cause the mounting portion of hte lifter to have each of predetermined movements at a predetermined timing, and to calculate a misalignment between the transportable object and the weighty object in the mounting station on the strength of a detection output of the position detecting means and cause the driving means to amend the movements of the mounting portion in response to the calculated misalignment.

In the weighty object mounting system thus constituted in accordance with the present invention, the stop position of the transportable object is detected by the position detecting means when the transportable object is transported into and then stopped temporarily at, for example, a station just before the mounting station by the tact-transporting means, and when the transportable object is transported into and then stopped temporarily at the mounting station, the driving portion of the lifter moves the mounting portion of the lifter, on which the weighty object is placed, forward or backward, left or right, and up or down in relation to the transportable object in the mounting station in accordance with the control commands from the control means so as to cause the weighty object to engage with the transportable object and to be mounted to the same. On the occasion of the movements of the mounting portion of the lifter, the misalignment between the transportable object and the weighty object in the mounting station is calculated by the control means on the strength of the detection output of the position detecting means and each movement of the mounting portion in the mounting station is amended in response to the calculated misalignment.

Accordingly, errors in position of the transportable object to the weighty object on the lifter in the mounting station is compensated so that the weighty object is prevented from interfering with the transportable object on the way to a proper position for engaging with the transportable object, and consequently the weighty object is mounted automatically and correctly to the transportable object carried into the mounting station.

The above, and other objects, features and advantages of the present invention will become apparent from the following detailed description which is to be read in conjunction with the accompanying drawings.

DESCRIPTION OF THE PREFERRED EMBODIMENT

Now, an embodiment of weighty object mounting system according to the present invention will be described in detail with reference to the accompanying drawings hereinafter.

Figure 1:
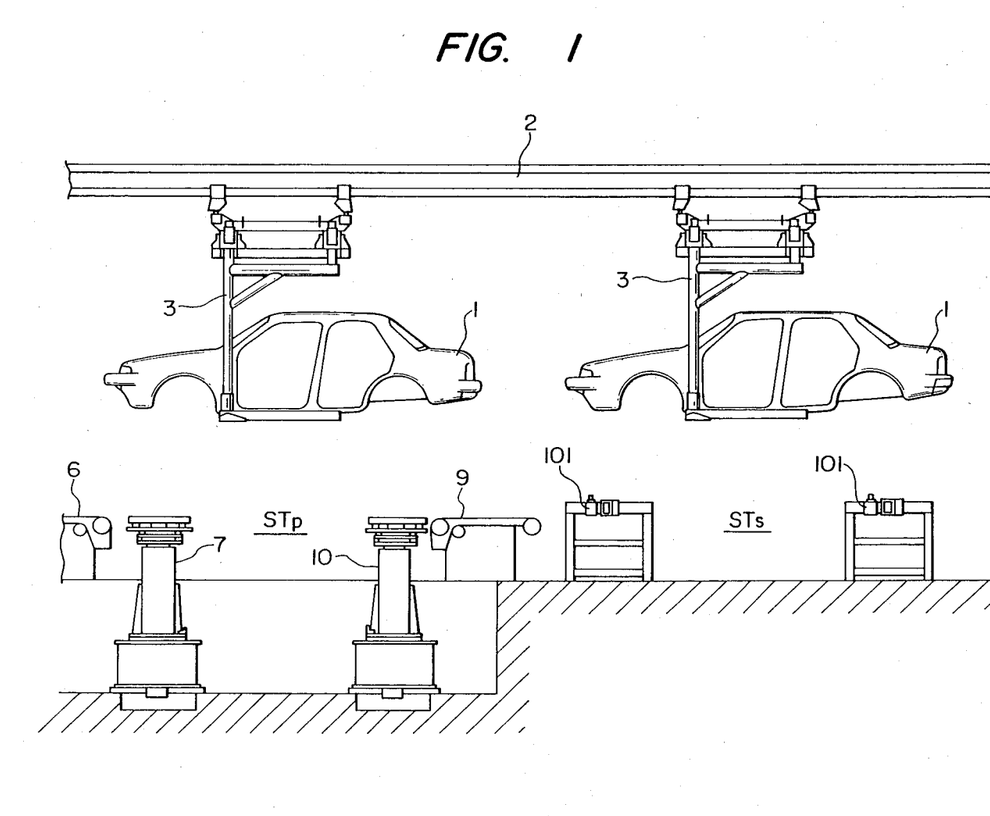
FIG. 1 is a schematic side view showing an embodiment of weighty object mounting system according to the present invention.

FIG. 1 shows schematically an example of the weighty object mounting system according to the present invention which is applied for mounting an engine and front and rear suspensions to a vehicle body in a vehicle assembly line.

Referring to FIG. 1, vehicle bodies 1 (transportable objects) are hung on hangers 3 and tact-transported by a tact conveyer 2 of the overhead type. The hangers 3 are engaged releasably with the tact conveyer 2. The tact conveyer 2 is composed of a rack and pinion mechanism in which the rack engages with each of the hangers 3 through a latch member provided thereto and the pinion is driven by a motor to move the rack intermittently, and branches from a vehicle body conveyer of the overhead type for transporting vehicle bodies 1 continuously (not shown in FIG. 1), so that the hangers 3 on which the vehicle bodies 1 are hung respectively are successively transferred to the tact conveyer 2 from the vehicle body conveyer.

Below the tact conveyer 2, a positioning station STs and a mounting station STp are established at a couple of adjacent stop positions of the tact conveyer 2, respectively. In the positioning station STs, optical position sensors 101 are provided for detecting the location of the vehicle body 1 transported thereinto and stopped thereat, and in the mounting station STp, front and rear lifters 7 and 10 are provided for supporting an engine and front and rear suspensions (weighty objects) to cause them to be mounted to the vehicle body 1 and further first and second conveying devices 6 and 9 are provided for supplying the engine and the front and rear suspensions to the front and rear lifters 7 and 10.

Figure 2:
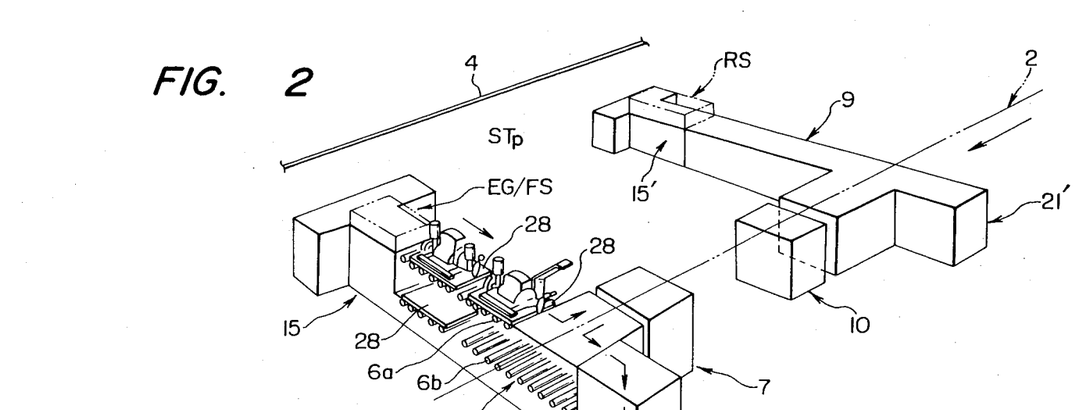
FIG. 2 is a schematic perspective view showing a part of the embodiment shown in FIG. 1.

As shown in FIG. 2, a main floor conveyer 4 is provided at a predetermined distance spaced from a location under the tact conveyer 2 to be substantially parallel with the tact conveyer 2. By this main floor conveyer 4, an engine EG and a front suspension FS are conveyed to be preceding and a rear suspension RS is also conveyed to follow the engine EG and the front suspension FS.

In the mounting station STp shown in FIG. 2, at the front portion thereof in the direction along the tact conveyer 2, the first conveying device 6 is disposed for conveying the engine EG and the front suspension FS which are conveyed by the main floor conveyer 4 toward the tact conveyer 2 as an engine-front suspension assembly EG/FS and the front lifter 7 is also disposed for supporting and lifting the engine-front suspension assembly EG/FS conveyed by the first conveying device 6 so as to mount the same to the vehicle body 1 transporterd into and stopped in the mounting station STp by the tact conveyer 2 at a predetermined front portion of the vehicle body 1. Further, at the rear portion of the mounting station STp in the direction along the tact conveyer 2, the second conveying device 9 is disposed for conveying the rear suspension RS which are conveyed by the main floor conveyer 4 to follow the engine EG and the front suspension FS toward the tact conveyer 2 and the rear lifter 10 is also disposed for supporting and lifting the rear suspension RS conveyed by the second conveying device 9 so as to mount the same to the vehicle body 1 transported into and stopped in the mounting station STp by the tact conveyer 2 at a predetermined rear portion of the vehicle body 1.

Figure 3:
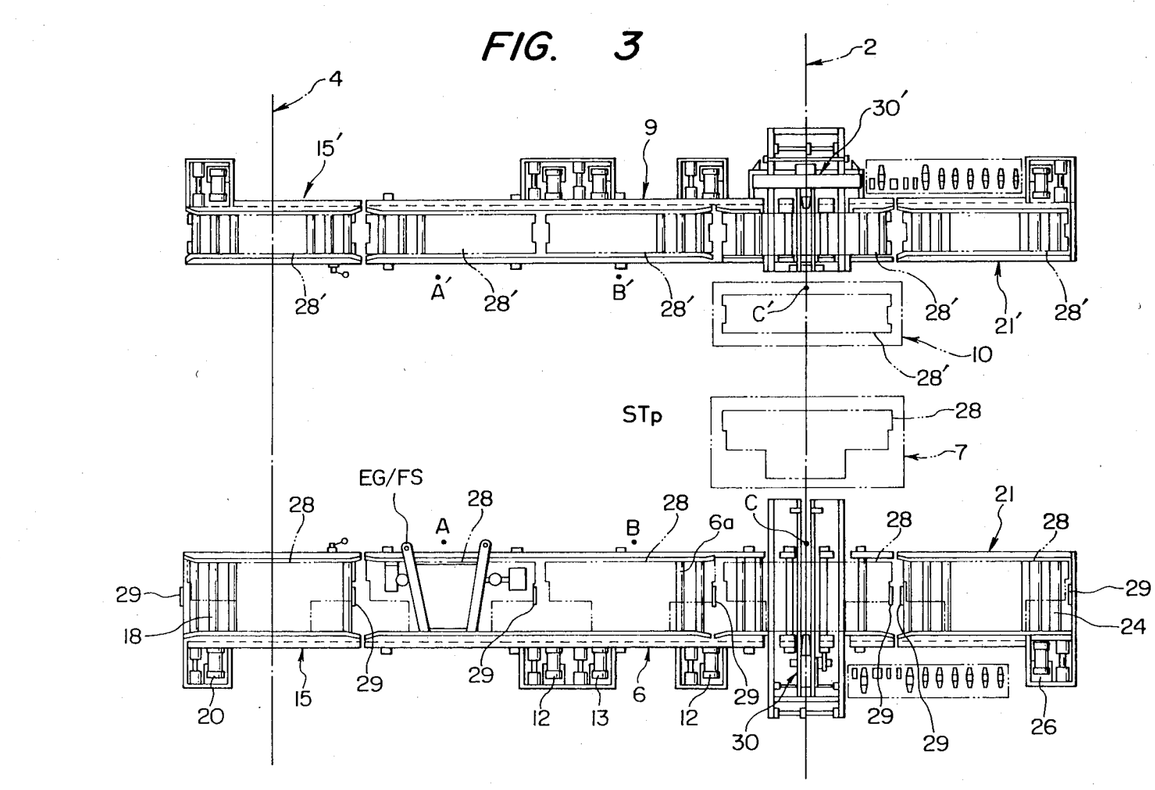
FIG. 3 is a schematic plan view showing a part of the embodiment shown in FIG. 1.
Figure 4:
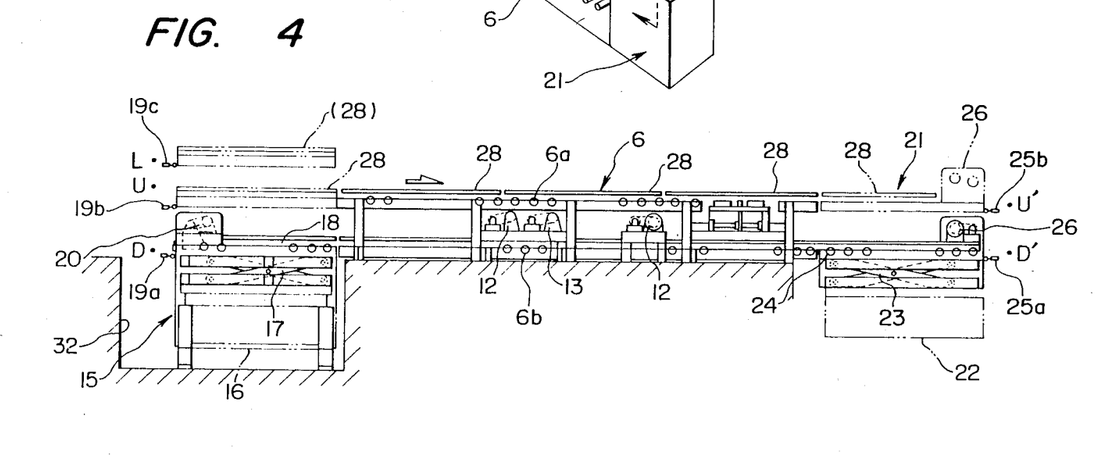
FIG. 4 is a schematic side view showing a part of the embodiment shown in FIG. 1.

As shown in detail in FIGS. 3 and 4, the first conveying device 6 is composed of an upper stage of an advancing roller conveyer 6a and a lower stage of a returning roller conveyer 6b. The advancing roller conveyer 6a has a plurality of rollers which are driven by a motor 12 to rotate for transfer toward the tact conveyer 2, and the returning roller conveyer 6b has a plurality of rollers which are driven by a motor 13 to rotate for transfer toward the main floor conveyer 4.

A loading lifter 15 is disposed at the starting end of the first conveying device 6 under the main floor conveyer 4 and provided with a roller conveyer 18 is supported by a pantograph 17 driven by a hydraulic mechanism 16. The roller conveyer 18 is moved up and down to be at a lower position D aligned with the returning roller conveyer 6b, at an upper position U aligned with the advancing roller conveyer 6a, and at a loading position L at which the engine EG and the front suspension FS are transferred to the roller conveyer 18 from the main floor conveyer 4. These positions D, U and L are detected by limit switches 19a, 19b and 19c, respectively. The roller conveyer 18 is driven by a motor 20 to rotate for transfer toward the tact conveyer 2.

A returning lifter 21 is disposed at the terminal end of the first conveying device 6 and provided with a roller conveyer 24 which is supported by a pantograph 23 driven by a hydraulic mechanism 22. The roller conveyer 18 is moved up and down to be at a lower position D' aligned with the returning roller conveyer 6b and at an upper position U' aligned with the advancing roller conveyer 6a. These positions D' and U' are detected by limit switches 25a and 25b, respectively. The roller conveyer 24 is driven by a motor 26 to rotate for transfer toward the main floor conveyer 4.

Sledges or pallets 28, on each of which the engine EG and the front suspension FS is loaded from the main floor conveyer 4 as the engine-front suspension assembly EG/FS, are successively put on the roller conveyer 18 of the loading lifter 15. The pallet 28 on the roller conveyer 18 of the loading lifter 15 is forwarded to a position A and then through a position B to a position C on the advancing roller conveyer 6a, and emptied at the position C. Then, the pallet 28 is further sent to the roller conveyer 24 of the returning lifter 21 to be transferred to the returning roller conveyer 6b through the downward movement of the roller conveyer 24, so as to be conveyed by the returning roller conveyer 6b to the roller conveyer 18 of the loading lifter 15 at the lower position D. With such movements of each of the pallets 28, three pallets 28 are placed on the advancing roller conveyer 6a and another pallet 28 is placed on the roller conveyer 24 of the returning lifter 21.

The pallet 28 transferred to the roller conveyer 18 of the loading lifter 15 is again provided thereon with the engine EG and the front suspension FS through the upward movement of the roller conveyer 18 to the loading position U' and thereafter forwarded to the position A on the advancing roller conveyer 6a after the downward movement of the roller conveyer 18 to the upper position U. Such a transportation cycle of the pallets 28 is repeated.

On the advancing roller converyer 6a, the roller conveyer 18 of the loading lifter 15 and the roller conveyer 24 of the returning lifter 21, stoppers 29 are provided respectively for positioning the respective pallets 28.

The position C on the advancing roller conveyer 6a is selected to be immediately below the tact conveyer 2 and a push-pull mechanism 30 is provided at the position C for pushing the pallet 28 conveyed to the position C together with the engine-front suspension assembly EG/FS loaded thereon so as to transfer the same to the front lifter 7 and pulling the pallet 28 emptied on the front lifter 7 back to the position C.

Figure 5:
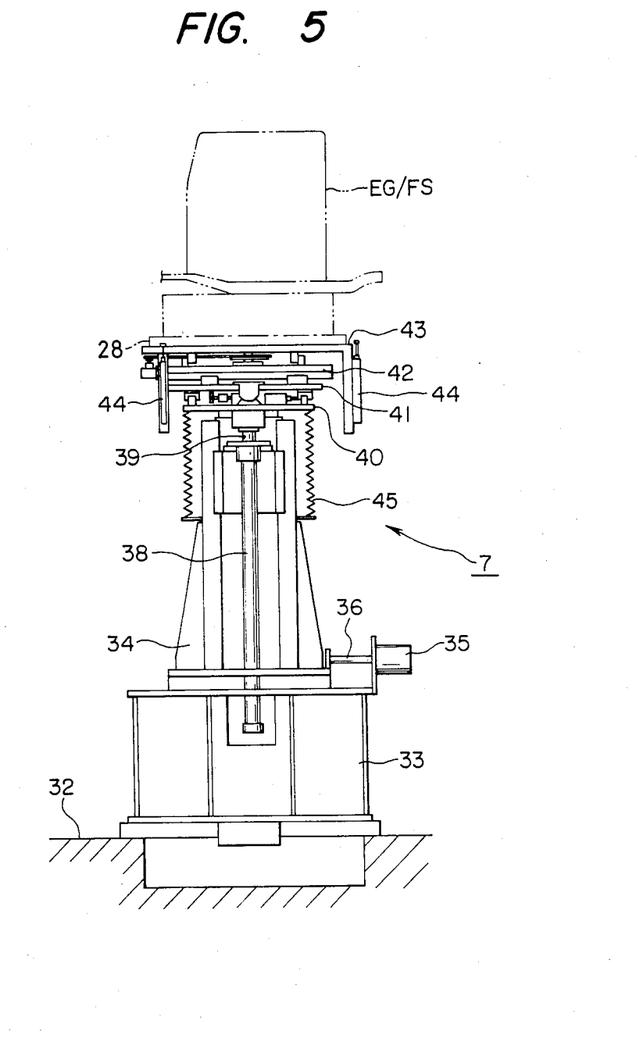
FIG. 5 is a schematic front view showing one example of a lifter used in the embodiment shown in FIG. 1.

As shown in FIG. 5, one example of the front lifter 7 has a support 34 provided on a base table 33 which is placed on a floor surface 32. The support 34 is mounted to be movable on the base table 33 in the direction of transportation of the vehicle body 1 by the tact converyer 2, and the movement of the support 34 on the base table 33 is adjusted by a ball thread device 36 driven by a motor 35. This results in that a distance between the front lifter 7 and the rear lifter 10 can be varied, so that the front and rear lifters 7 and 10 are able to be used for mounting the engine EG and the front and rear suspensions FS and RS to each of various vehicle bodies for vehicles having different wheel bases.

The support 34 is provided with a lifting cylinder 38 accompanied with a piston 39 and a base plate 40 is fixed on the top of the piston 39. On the base plate 40, a first sliding plate 41 is stacked, and a second sliding plate 42 is stacked on the first sliding plate 41. Then, a turntable 43 is further stacked on the second sliding plate 42. Besides, a spring member 45 is interposed between the base plate 40 and the support 34 for aiding the base plate 40 in ascending. The turntable 43 is provided on its side portions with an appropriate number of nut-runners 44 used for tightly fastening the engine EG and the front and rear suspensions FS and RS to the vehicle body 1.

As shown in FIGS. 6 to 10, first sliding arrangement 50, second sliding arrangement 62 and rotary arrangement 75, which include the base plate 40, the first and second sliding plates 41 and 42 and the turntable 43, are constituted in the front lifter 7. The first sliding arrangement 50 comprises the base plate 40 and the first sliding plate 41 disposed above the base plate 40 to face the same. The first sliding plate 41 is arranged to be movable relative to the base plate 40 in a direction perpendicular to the direction of the transportation of the vehicle body 1 in the mounting station STp (hereinafter, referred to as a lateral direction) with four first guide receivers 52 which are fixed to the lower surface of the first sliding plate 41 and have respective grooves with which guide bars 51 fixed on the egdes of the upper surface of the base plate 40 opposite to tach other in a direction along the transportation of the vehicle body 1 in the mounting station STp (hereinafter, referred to as a longitudinal direction) are engaged.

Figure 6:
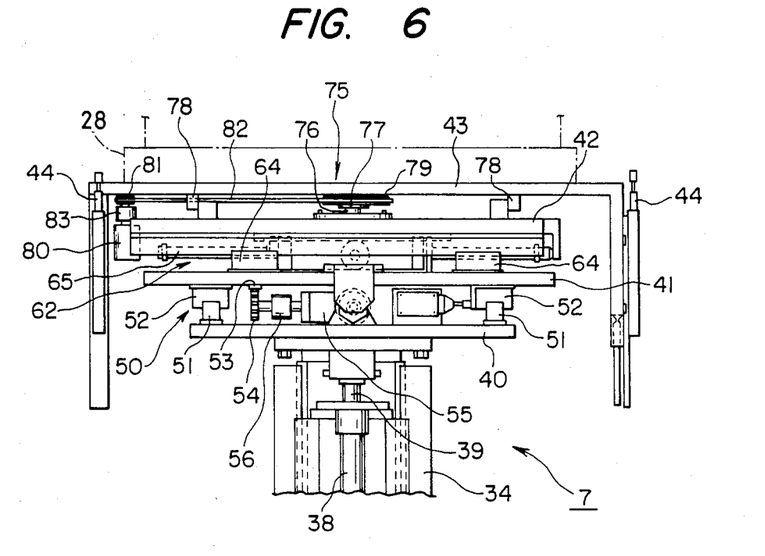
FIG. 6 is an enlarged front view of a part of the lifter shown in FIG. 5.
Figure 7:
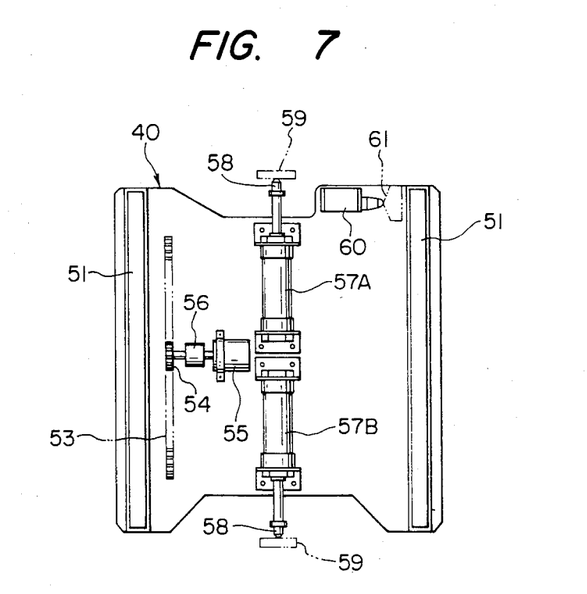
FIG. 7 is a plan view of a base plate included in the lifter shown in FIGS. 5 and 6.
Figure 8:
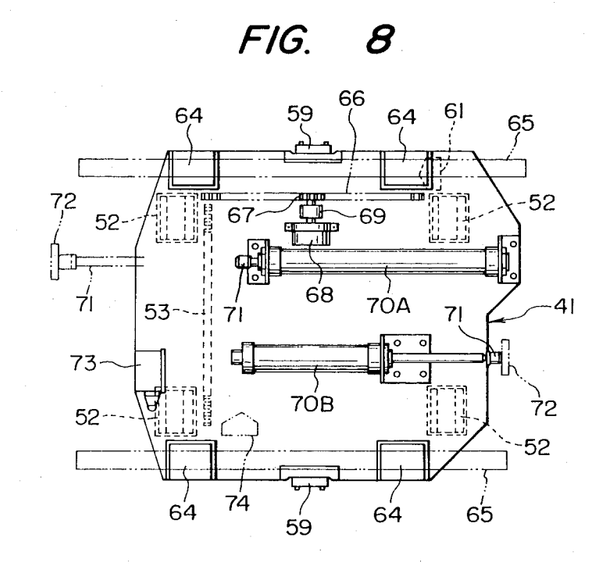
FIG. 8 is a plan view of a first sliding plate included in the lifter shown in FIGS. 5 and 6.

The movement of the first sliding plate 41 is caused by a pinion gear 54 which is meshed with a rack gear 53 fixed to the lower surface of the first sliding plate 41 and rotated by a motor 55 mounted on the base plate 40. A clutch device 56 is provided between the pinion gear 54 and the motor 55 for selectively making and breaking a power transmitting path to the pinion gear 54 from the motor 55, and the first sliding arrangement 50 is operated automatically or manually depend on the state of the clutch device 56. In more detail, when the clutch device 56 is in engagement, the pinion gear 54 is coupled through the clutch device 56 with the motor 55 to be rotated thereby, so that the first sliding arrangement 50 can be operated automatically, and to the contrary, when the clutch device 56 is in disengagement, the pinion gear 54 is disconnected from the motor 55 to be rotatable with the movement of the rack gear 53, so that the first sliding arrangement 50 can be operated manually so as to permit the first sliding plate 41 to slide in relation to the base plate 40 when it is pushed or pulled manually.

The base plate 40 is provided with a pair of cylinders 57A and 57B aligned in the lateral direction and used for indexing a lateral reference position of the first sliding plate 41 in relation to the base plate 40, and the first sliding plate 41 is provided with a pair of stoppers 59 disposed at its sides opposite to each other in the lateral direction so that the abutments 58 of the cylinders 57A and 57B run against the stoppers 59, respectively, when each of the cylinders 57A and 57B is expanded. The lateral reference position of the first sliding plate 41 is indexed by means of expanding each of the cylinders 57A and 57B to cause the abutment 58 thereof to run into the stopper 59 corresponding thereto prior to the weighty object mounting operation. The indexing of the lateral reference position of the first sliding plate 41 is confirmed with the engagement of a limit switch 60 mounted on the upper surface of the base plate 40 with a limit guide 61 fixed to the lower surface of the first sliding plate 41.

Figure 9:
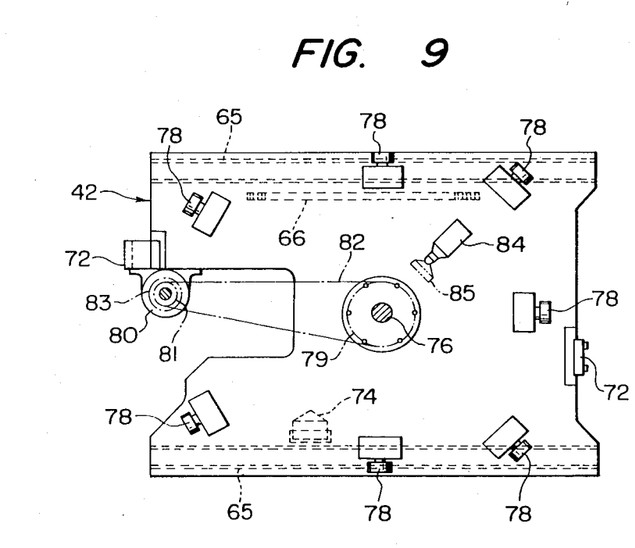
FIG. 9 is a plan view of a second sliding plate included in the lifter shown in FIGS. 5 and 6.

As shown in FIGS. 6, 8 and 9, the second sliding arrangement 62 comprises the first sliding plate 41 and the second sliding plate 42 disposed above the first sliding plate 41 to face the same. The second sliding plate 42 is arranged to be movable relative to the first sliding plate 41 in the longitudinal direction with four second guide receivers 64 which are fixed on the upper surface of the first sliding plate 41 and have respective grooves with which guide bars 65 fixed to the egdes of the lower surface of the second sliding plate 42 opposite to each other in the lateral direction are engaged.

The movement of the second sliding plate 42 is caused, in the similar manner as the movement of the first sliding plate 41 relative to the base plate 40, by a pinion gear 67 which is meshed with a rack gear 66 fixed to the lower surface of the second sliding plate 42 and rotated by a motor 68 mounted on the first sliding plate 41. A clutch device 69 is also provided between the pinion gear 67 and the motor 68 for selectively making and breaking a power transmitting path to the pinion gear 67 from the motor 68, and the second sliding arrangement 62 is operated automatically with the engagement of the clutch device 69 or manually with the disengagement of the clutch device 69, in the similar manner as the first sliding arrangement 50.

The first sliding plate 41 is provided on its upper surface with a pair of cylinders 70A and 70B disposed in parallel in the lateral direction and used for indexing a longitudinal reference position of the second sliding plate 42 in relation to the first sliding plate 41, and the second sliding plate 42 is provided with a pair of stoppers 72 disposed at its sides opposite to each other in the longitudinal direction so that an abutments 71 of the cylinders 70A and 70B run against the stoppers 72, respectively, when each of the cylinders 70A and 70B is expanded. The longitudinal reference position of the second sliding plate 42 is indexed by means of expanding each of the cylinders 70A and 70B to cause the abutment 71 thereof to run into the stopper 72 corresponding thereto. Then, the indexing of the longitudinal reference position of the second sliding plate 42 is confirmed with the engagement of a limit switch 73 mounted on the upper surface of the first sliding plate 41 with a limit guide 74 fixed to the lower surface of the second sliding plate 42.

As shown in FIGS. 6 and 9, the rotary arrangment 75 comprises the second sliding plate 42 and the turntable 43 disposed above the second sliding plate 42 to face the same. The turntable 43 is provided at its central portion with a bearing 77 which engages with a rotary shaft 76 projecting upward from the central portion of the second sliding plate 42, and the second sliding plate 42 is provided on its upper surface with seven supporting rollers 78 each of which engages with the lower surface of the turntable 43. With the engagement of the bearing 77 with the rotary shaft 76 and the engagement of the each of the supporting rollers 78 with the lower surface of the turntable 43, the turntable 43 is supported to be rotatable on the second sliding plate 42.

A relatively large wheel 79 is attached to the bearing 77 of the turntable 43 and a relatively small wheel 81 is fixed to a motor 80 mounted on the second sliding plate 42. In addition, a belt 82 is engaged with both the relatively large wheel 79 and the relatively small wheel 81 to pass around them. Thus, the turntable 43 can be rotated about the rotary shaft 76 by a rotatory force transmitted thereto through the belt 82 from the motor 80. Further, a clutch device 83 is interposed between the motor 80 and the relatively small wheel 81, so that the turntable 43 is disconnected from the motor 80 to be rotated freely when the clutch device 83 is in disengagement.

Figure 10:
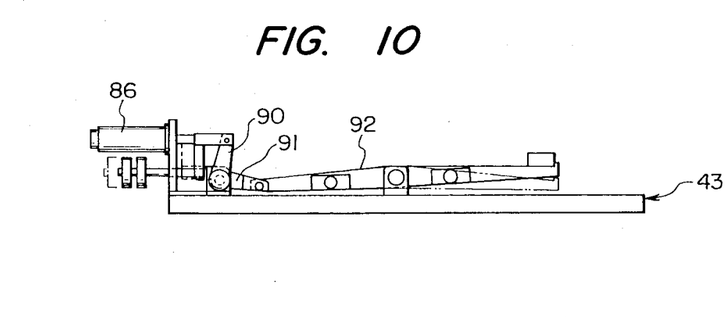
FIG. 10 is a side view of a turntable included in the lifter shown in FIGS. 5 and 6.

A reference position of the turntable 43 in relation to the second sliding plate 42 is confirmed with the engagement of a limit switch 84 mounted on the upper surface of the second sliding plate 42 with a limit guide 85 provided to the turntable 43. The turntable 43 functions as a mounting table on which the pallet 28 accompanied with the engine-front suspension assembly EG/FS is placed, and as shown in FIG. 10, a locking lever 92 which is moved to swing up and down through links 90 and 91 by a cylinder 86 is provided on the upper surface of the turntable 43 for engaging with the rear end of the pallet 28 placed on the turntable 43 so as to lock the pallet 28 at a predetermined location on the turntable 43. Further, the engine-front suspension assembly EG/FS is normally positioned and held at an appropriate location on the pallet 28. Accordingly, the engine-front suspension assembly EG/FS which is put on the turntable 43 through the pallet 28 is normally positioned in a predetermined location in the mounting station STp.

It is to be noted that the second conveying device 9 and the rear lifter 10 are of the same configuration as the first conveying device 6 and the front lifter 7, respectively, and therefore, in the second conveying device 9 and the rear lifter 10, devices, parts, portions and arrangements corresponding to those of the first conveying divece 6 and the front lifter 7 are marked with corresponding references with primes and the detailed description thereof will be omitted.

In connection with the front and rear lifters 7 and 10 thus constituted, a control device is provided for controlling the sequential operation of each of them. Each of the front and rear lifters 7 and 10 is controlled in its operation by the control device in the same manner. Accordingly, the operation of the front lifter 7 will be described hereinafter and the description of the operation of the rear lifter 10 will be omitted.

Figure 11:
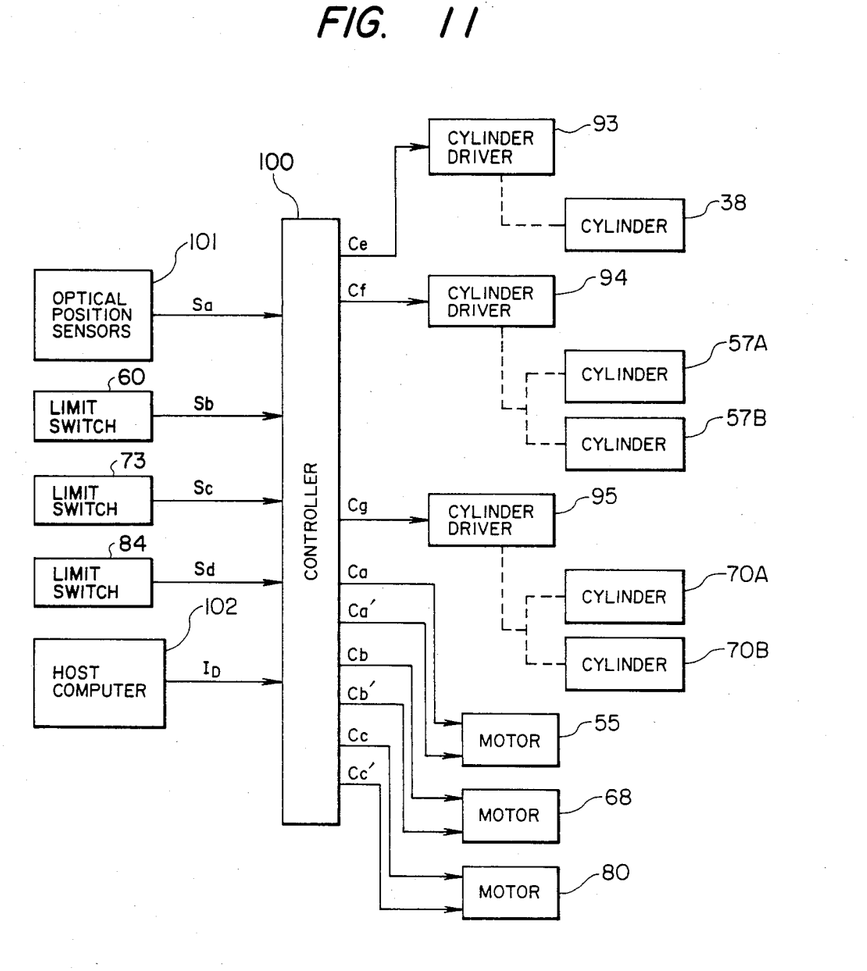
FIG. 11 is a schematic block diagram showing a control system used in the embodiment shown in FIG. 1.

As shown in FIG. 11, a controller 100 is provided for controlling the operations of the lifting cylinder 38, the cylinders 57A and 57B for indexing the lateral reference position of the first sliding plate 41 in relation to the base plate 40, the cylinders 70A and 70B for indexing the longitudinal reference position of the second sliding plate 42 in relation to the first sliding plate 41, and the motors 55, 68 and 80 for moving the first sliding plate 41, the second sliding plate 42 and the turntable 43, respectively. To the controller 100, detection output signal Sa from each of the optical position sensors 101 provided in the positioning station STs and reference position signals Sb, Sc and Sd derived from the limit switches 60, 73 and 84 respectively are supplied. The reference position signal Sb is obtained when the first sliding plate 41 is positioned at the lateral reference position in relation to the base plate 40 and therefore the limit switch 60 is in the ON state. Similarly, the reference position signal Sc is obtained when the second sliding plate 42 is positioned at the longitudinal reference position in relation to the first sliding plate 41 and therefore the limit switch 73 is in the ON state. Further, the reference position signal Sd is obtained when the turntable 43 is positioned at the reference position in relation to the second sliding plate 42 and therefore the limit switch 84 is in the ON state.

In addition, a host computer 102 is also connected to the controller 100. This host computer 102 is operative to manage, for example, the output of daily production, types of vehicle bodies to be assembled and the sequence in assembling of different types of vehicle bodies, and supplies the controller 100 with an information signal $I_D$ which represents a type of a vehicle body conveyed into the mounting station STp and a type of an engine-front suspension assembly being to be mounted to the vehicle body conveyed into the mounting station STp. The controller 100 to which the information signal $I_D$ has been supplied from the host computer 102 is operative to select one of different control patterns for movements of engine-front suspension assemblies each memorized previously therein in accordance with the contents of the information signal $I_D$.

Then, the controller 100 supplies the motors 55, 68 and 80 with driving signals Ca, Cb and Cc for normal revolutions or driving signals Ca', Cb' and Cc' for reverse revolutions, respectively, and also supplies a cylinder driver 93 provided for driving the lifting cylinder 38, a cylinder driver 94 provided for driving the cylinders 57A and 57B, and a cylinder driver 95 provided for driving the cylinders 70A and 70B with control signals Ce, Cf and Cg, respectively, in response to the signals Sa, Sb, Sc, Sd and $I_D$ obtained from the optical position sensors 101, the limit switches 60, 73 and 84, and the host computer 102, respectively. When the driving signal Ca or Ca' is supplied to the motor 55 from the controller 100, the motor 55 comes into normal or reverse revolutions so as to move the first sliding plate 41 in the lateral direction on the base plate 40, and when the driving signal Cb or Cb' is supplied to the motor 68 from the controller 100, the motor 68 comes into normal or reverse revolutions so as to move the second sliding plate 42 in the longitudinal direction on the first sliding plate 41. Further, when the driving signal Cc or Cc' is supplied to the motor 80 from the controller 100, the motor 80 comes into normal or reverse revolutions so as to rotate the turntable 43 clockwise or counterclockwise on the second sliding plate 42.

With such configurations of the respective portions as mentioned above, when the vehicle body 1 hung on the hanger 3 is continuously transported by the vehicle body conveyer and reaches a predetermined location, it is transferred to the tact conveyer 2 through an appropriate feeder provided between the vehicle body conveyer and the tact conveyer 2 and tact-transported toward the positioning station STs by the tact conveyer 2. When the vehicle body 1 is transported into and stopped in the positioning station STs, an actual position of the vehicle body 1 in the positioning station STs is detected by the optical position sensors 101, and the detection output signal Sa obtained from each of the optical position sensors 101 is supplied to the controller 100 in which a certain control pattern for movement of the engine-front suspension assembly EG/FS has been selected in accordance with the information signal $I_D$ supplied previously from the host computer 102. The controller 100 selects positional reference data therein in accordance with the information concerning the type of the vehicle body 1 contained in the information signal $I_D$ and compares positional data obtained on the strength of the detection output signal Sa from each of the optical position sensors 101 with the selected positional reference data so as to calculate positional deviation of the vehicle body 1 from a reference location in the positioning station STs. This positional deviation of the vehicle body 1 corresponds to misalignment between the vehicle body 1 and the engine-front suspension assembly EG/FS in the mounting station STp. Then, the controller makes an amendment of the selected control pattern in response to the calculated positional deviation of the vehicle body 1.

After that, the vehicle body 1 is further tact-transported into the mounting station STp from the positioning station STs and stopped therein by the tact conveyer 2, while the engine-front suspension assembly EG/FS conveyed by the first conveying device 6 is transferred to the front lifter 7 to be placed on the turntable 43 thereof through the pallet 28. When both the vehicle body 1 and the engine-front suspension assembly EG/FS are located in the mounting station STp, first a control operation for indexing the respective reference positions of the first sliding plate 41, the second sliding plate 42 and the turntable 43 in the front lifter 7 is performed. In such control operation, the control signals Cf and Cg are supplied from the controller 100 to the cylinder drivers 94 and 95, respectively, so that the cylinder drivers 94 and 95 cause the cylinders 57A and 57B and the cylinders 70A and 70B to expand, respectively, and the driving signal Cc or Cc' is supplied to the motor 80, so that the motor 80 is driven to have normal revolutions or reverse revolutions. With these operations of the cylinders 57A, 57B, 70A and 70B and the motor 80, the first sliding plate 41 is moved to the lateral reference position in relation to the base plate 40, the second sliding plate 42 is moved to the longitudinal reference position in relation to the first reference plate 41, and the turntable 43 is rotated to the reference position in relation to the second sliding plate 42.

When the first sliding plate 41, the second sliding plate 42 and the turntable 43 are positioned at the respective reference positions, the limit switches 60, 73 and 84 are turned on and the reference position signals Sb, Sc and Sd are supplied to the controller 100. The controller 100 stops to supply the control signals Cf and Cg and the driving signal Cc or Cc' when the reference position signals Sb, Sc and Sd are received, respectively.

Then, the controller 100 supplies the cylinder driver 93 with the control signal Ce in accordance with the amended control pattern and also supplies the motors 55, 68 and 80 with the driving signals Ca, Cb and Cc or the driving signals Ca', Cb' and Cc', respectively. As a result, the lifting cylinder 38 is expanded upward by the cylinder driver 93 so as to cause the base plate 40 to be lifted, the first and second sliding plates 41 and 42 are moved from the respective reference positions in the lateral and longitudinal directions, respectively, and the turntable 43 is rotaterd from the reference position. With these movements of the base plate 40, first and second sliding plates 41 and 42, and turntable 43, the engine-front suspension assembly EG/FS placed on the turntable 43 is lifted toward the inside of the vehicle body 1 without interferring with various portions of the vehicle body 1 in accordance with the amended control pattern which is obtained in the controller by adding the amendment made in response to the detection output signal Sa from each of the optical position sensors 101 to the control pattern selected in accordance with the contents of the information signal $I_D$ from the host computer 102.

When the engine-front suspension assembly EG/FS placed on the turntable 43 reaches to an appropriate position for being mounted to the vehicle body 1, the nutrunners 44 are operated to fasten the engine-front suspension assembly EG/FS to the vehicle body 1, and after that, the base plate 40, first and second sliding plates 41 and 42, and turntable 43 are returned to the respective reference positions.

Figure 12:
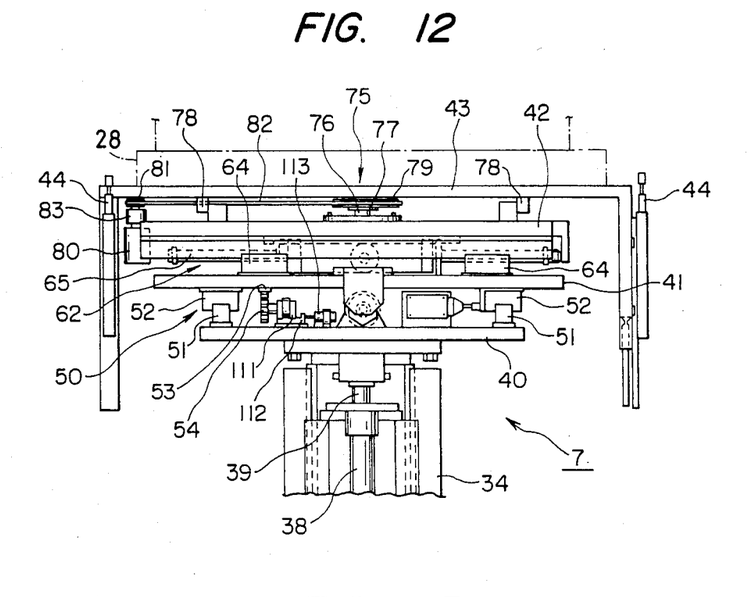
FIG. 12 is an enlarged front view showing a part of another example of a lifter used in the embodimemt show in FIG. 1.

FIG. 12 shows another example of the front lifter 7 used in the embodiment shown in FIGS. 1 to 4. This example is different only in the configuration for selectively making and breaking the respective power transmitting paths mentioned above, and in FIG. 12, parts, portions and arrangements corresponding to those of FIG. 6 are marked with the same references and the detailed description thereof will be omitted. For this example, the power transmitting path in the first sliding arrangement 50 will be described with reference to FIG. 13 which shows the base plate 40, by way of example.

Figure 13:
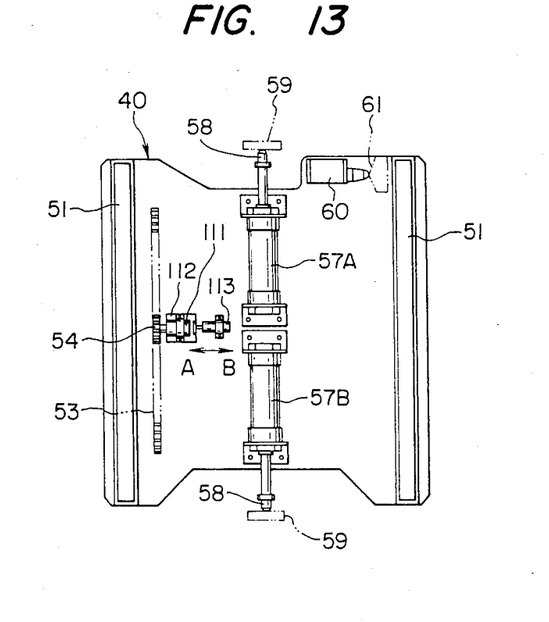
FIG. 13 is a plan view of a base plate included in the lifter shown in FIG. 12.

As shown in FIGS. 12 and 13, in the power transmitting path in the first sliding arrangement 50 of this example, the pinion gear 54 is directly coupled with a motor 111 which is fixed on a sliding board 112 provided on the base plate 40. The sliding board 112 is able to be moved by a cylinder 113 in a direction indicated with arrows A and B in FIG. 13.

When the cylinder 113 is expanded, the pinion gear 54 and the motor 111 are moved together along the arrow A and the pinion gear 54 mates with the rack gear 53 fixed to the lower surface of the first sliding plate 41, so that the first sliding arrangement 50 is automatically operated by the motor 111. On the other hand, when the cylinder 113 is retracted, the pinion gear 54 is disengaged from the rack gear 53 and therefore the rack gear 53 is disconnected from the motor 111 to be able to move freely, so that the first sliding arrangement 50 can be operated manually to permit the first sliding plate 41 to slide in relation to the base plate 40 when it is pushed or pulled manually.

Incidentally, it is to be understood that the rear lifter 10 can be also constructed to be similar to the example of the front lifter 7 shown in FIG. 12.

Figure 14:
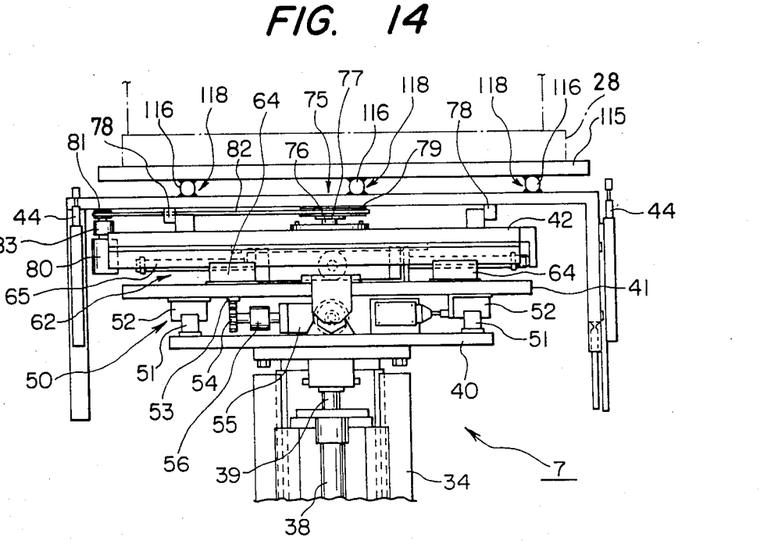
FIG. 14 is an enlarged front view showing a part of a further example of a lifter used in the embodiment shown in FIG. 1.

FIG. 14 shows a further example of the front lifter 7 used in the embodiment shown in FIGS. 1 to 4. In FIG. 12 also, parts, portions and arrangements corresponding to those of FIG. 6 are marked with the same references and the detailed description thereof will be omitted.

Figure 15:
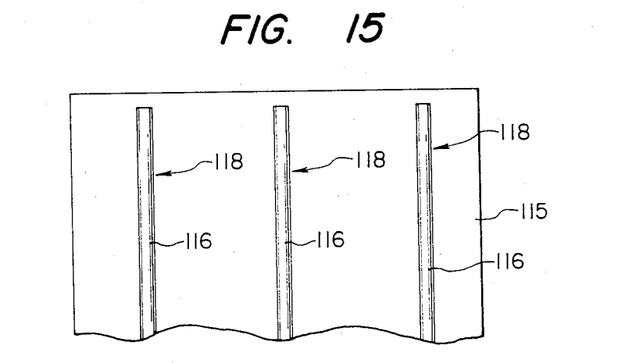
FIG. 15 is a plan view showing a part of a mounting table included in the lifter shown in FIG. 14.
Figure 16:
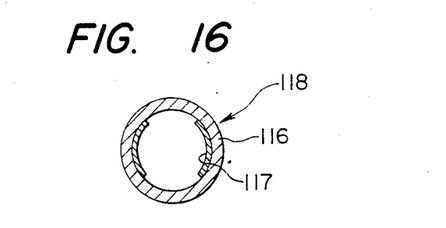
FIG. 16 is a cross sectional view showing a lord detector included in the lifter shown in FIG. 14.

In the example shown in FIG. 14, a mounting table 115 is placed on the turntable 43 and three pipes 116 which elongate in parallel with each other as shown in FIG. 15 are secured by welding between the mounting table 115 and the turntable 43. As shown in FIG. 16, each of the pipes 116 has a strain gauge 117 affixed on the interior thereof for detecting the strain of the pipe 116, so that a load detector 118 is constituted by the pipe 116 and the strain gauge 117. A detection output signal obtained from the strain gauge 117 is supplied to the controller 100.

When the mounting table 115 is burdened with a load in excess of a predetermined load value and therefore an excessive strain arises in the pipe 116, the front lifter 7 is prevented from ascending by the controller 100 which operates in response to the detection output signal supplied from the strain gauge 117. The predetermined load value set for the mounting table 115 may be selected, for example, at the total weight of the pallet 28, the engine-front suspension assembly EG/FS and the vehicle body 1.

In the case where the vehicle body 1 is being hung on the hanger 3 in an inclined state during the mounting of the engine-front suspension assembly EG/FS and the rear suspension RS carried out in the mounting station STp, it is feared that, for example, the engine EG pushes up the vehicle body 1 so that an abnormality or torule arises in the front lifter 7 or the rear suspension RS does not reach an appropriate position for being mounted to the vehicle body 1 so as to fail to be mounted to the vehicle body 1.

On the contrary, with the example of the front lifter 7 shown in FIG. 14, when the engine EG placed on the mounting table 115 pushes up the vehicle body 1 which is hung on the hanger 3 with its inclination and as a result the mounting table 115 is burdened with a load in excess of the predetermined load value, each of the pipes 116 provided between the mounting table 115 and the turntable 43 is deformed excessively and this excessive deformation is detected by the strain gauge 117. Then, the detection output signal obtained from the strain gauge 117 by which the excessive deformation of the pipe 116 is detected is supplied to the controller 100, and the controller 100 operates to make the front and rear lifters 7 and 10 cease ascending immediately in response to the detection output signal from the strain gauge 117. This results in that the front lifter 7 is prevented from being burdened with a load more than an allowable amount and the rear lifter 10 is prevented from causing an improper mounting of the rear suspension to the vehicle body 1.

In this case also, it is to be understood that the rear lifter 10 can be also constructed to be similar to the example of the front lifter 7 shown in FIG. 14.

What is claimed is:

1. A weighty object mounting system comprising:
   tact-supporting means for transporting a transportable object in such a manner that the transportable object is stopped temporarily at each of working stations arranged in series,
   position detecting means for detecting a stop position of the transportable object stopped temporarily at one of the working stations,
   lifting means provided in a mounting station in which a weighty object is mounted automatically to the transportable object, said lifting means including at least one weighty object lifter comprising a mounting portion provided for supporting the weighty object placed thereon and arranged to be moveable forward and backward, right and left, and up and down in relation to the transportable object carried into the mounting station from said one of the working stations, and driving means for moving said mounting portion forward and backward, right and left, and up and down in relation to the transportable object in the mounting station so as to cause the weighty object to engage with the transportable object and to be automatically mounted to the same, and
   control means operative to supply said driving means in the weighty object lifter with control commands directing said driving means to cause said mounting portion of the weighty object to have each of predetermind movements at a predetermined timing, said control means being further operative to calculate a misalignment between the transportable object and the weighty object in the mounting station on the strength of a detection output of said position detecting means and to cause said driving means to amend the movements of said mounting portion in response to the calculated misalignment, wherein said mounting portion of the weighty object lifter comprises a first movable member provided to be moved up and down in relation to the transportable object in the mounting station, a second movable member provided on said first movable member to be moved right and left in relation to the transportable object in the mounting station, and a third movable member provided on said second sliding member to be moved forward and backward in relation to the transportable object in the mounting station.

2. A weighty object mounting system according to claim 1, wherein said driving means in the weighty objejct lifter comprises first driving arrangement for moving said first movable member, a second driving arrangement for moving said second movable member, and a third driving arrangement for moving said third movable member.

3. A wieghty object mounting system according to claim 2, wherein said second driving arrangement comprises a first rack member attached to said second movable member, a first pinion member for mating with said first rack member and a first pinion driving device connected with said first pinion member, and said third driving arrangement comprises a second rack member attached to said third movable member, a second pinion member for mating with said second rack member and a second pinion driving device connected with said second pinion member.

4. A weighty object mounting system according to claim 2, wherein each of said second and third driving arrangement includes clutch means for making selectively each of said second and third driving arrangements operative and inoperative.

5. A weighty object mounting system according to claim 4, wherein said mounting portion of the weighty object lifter further comprises first position indexing means for indexing a reference position of said second movable member in relation to said first movable member and second position indexing means for indexing a reference position of said third movable member in relation to said second movable member.

6. A weighty object mounting system according to claim 5, wherein said first position indexing means includes means for moving said second movable member into the reference position thereof when said second driving arrangement is caused to be inoperative by the clutch means provided therein and said second position indexing means includes means for moving said third movable member into the reference position thereof when said third driving arrangement is caused to be inoperative by the clutch means provided therein.

7. A weighty object mounting system according to claim 1, wherein said mounting portion of the weighty object lifter further comprises a rotatable member provided on said third movable member to be rotated about an axis elongating up and down.

8. A weighty object mounting system according to claim 7, wherein said driving means in the weighty object lifter comprises first driving arrangement for moving said first movable member, a second driving arrangement for moving said second movable member, a third driving arrangement for moving said third movable member, and a fourth driving arrangement for rotating said rotatable member.

9. A weighty object mounting system according to claim 7, wherein said mounting portion of the weighty object lifter further comprises a mounting member provided on said rotatable member and load detecting means provided between said mounting member and said rotatable member for detecting an excessive load with which said mounting portion is burdened.

10. A weighty object mounting system according to claim 1, wherein said mounting station is disposed next to said one of the working stations in which said position detecting means is provided.

11. A weight object mounting system according to claim 10, wherein said position detecting means comprises at least one optical position sensor.

12. A weighty object mounting system comprising:
tact-transporting means for the transporting a transportable object in such a manner that the transportable object is stopped temporarily at each of working stations arranged in series,
position detecting means for detecting a stop position of the transportable object stopped temperarily at one of the working stations,
lifting means provided in a mounting station in which a weighty object is mounted automatically to the transportable object, said lifting means including at least one weighty object lifter comprising a mounting portion provided for supporting the weighty object placed thereon and arranged to be movable forward and backward, right and left, and up and down in relation to the transportable object carried into the mouting station from said one of the working stations, and driving means for moving said mounting portion forward and backward, right and left, and up and down in relation to the transportable object in the mounting station so as to cause the weighty object to engage with the transportable object and to be automatically mounted to the same, and
control means operative to supply said driving means in the weighty object lifter with control commands directing said driving means to cause said mounting portion of the weighty object lifter to have each of predetermined movements at a predetermined timing, said control means being further operative to calculate a misalignment between the transportable object and the weighty object in the mounting station on the strength of a detection output of said position detecting means and to cause said driving means to amend the movements of said mounting portion in response to the calculated misalignment, wherein said tact-transporting means is arranged to transport a vehicle body as said transportable object, and said lifting means comprises a first weighty object lifter for supporting a combination of an engine and one of front and rear suspensions placed thereon as said weighty object and a second weighty object lifter for supporting the other of front and rear suspensions placed thereon as said weighty object.

13. A weighty object mounting system according to claim 12, wherein said lifting means further comprises adjusting means for varying a distance between the first and second weighty object lifters so as to cause the same to correspond to the size of said vehicle body.

* * * * *